US012025976B2

(12) United States Patent
Hoernicke et al.

(10) Patent No.: US 12,025,976 B2
(45) Date of Patent: Jul. 2, 2024

(54) METHOD ASSOCIATED WITH A SIMULATION MODEL OF A PROCESS MODULE, COMPUTER PROGRAM PRODUCT, AND NON-VOLATILE DATA STORAGE MEDIUM

(71) Applicant: ABB Schweiz AG, Baden (CH)

(72) Inventors: Mario Hoernicke, Landau (DE); Katharina Stark, Weinheim (DE)

(73) Assignee: ABB Schweiz AG, Baden (CH)

( * ) Notice: Subject to any disclaimer, the term of this patent is extended or adjusted under 35 U.S.C. 154(b) by 625 days.

(21) Appl. No.: 17/267,154

(22) PCT Filed: Aug. 6, 2019

(86) PCT No.: PCT/EP2019/071139
§ 371 (c)(1),
(2) Date: Feb. 9, 2021

(87) PCT Pub. No.: WO2020/030652
PCT Pub. Date: Feb. 13, 2020

(65) Prior Publication Data
US 2021/0302950 A1 Sep. 30, 2021

(30) Foreign Application Priority Data
Aug. 9, 2018 (EP) .................................. 18188232

(51) Int. Cl.
*G05B 19/418* (2006.01)
*G05B 13/02* (2006.01)

(52) U.S. Cl.
CPC ... *G05B 19/41885* (2013.01); *G05B 13/0265* (2013.01); *G05B 2219/32128* (2013.01); *G05B 2219/34295* (2013.01)

(58) Field of Classification Search
CPC .......... G05B 19/41885; G05B 13/0265; G05B 2219/32128; G05B 2219/34295;
(Continued)

(56) References Cited

U.S. PATENT DOCUMENTS 8,135,481 B2 * 3/2012 Blevins ................. G06Q 50/04
702/179
10,088,837 B1 * 10/2018 Strain .............. G05B 19/41865
(Continued)

FOREIGN PATENT DOCUMENTS

CN 101221435 A 7/2008
CN 105589442 A 5/2016
(Continued)

OTHER PUBLICATIONS

Bernshausen et al., "Namur Modul Type Package-Definition," *atp magazin*, 58(01-02): 72-81 (Feb. 12, 2016).
(Continued)

*Primary Examiner* — Chad G Erdman
(74) *Attorney, Agent, or Firm* — Leydig, Voit & Mayer, Ltd.

(57) ABSTRACT

The disclosure describes a method associated with a simulation model of a process module configured to execute at least one module service. The process module is interlinkable or interlinked with further process modules to carry out a technical process in a cascade of module services, and includes Providing a process logic specification of the technical process, a control logic specification of the process module, a state engine of the process module from a configuration of the at least one service, and a process connection information of the technical process; Generating at least a part of the simulation model from a combination thereof, and Linking at least a part of the generated simulation model to a module type package for the process
(Continued)

module, or extending a module type package for the process module by at least a part of the generated simulation model.

11 Claims, 6 Drawing Sheets

(58) Field of Classification Search
CPC ......... G05B 17/02; G05B 2219/23456; G05B 2219/25314; G05B 2219/34205; G05B 2219/35029; G05B 19/41845; G05B 19/0428; Y02P 90/02
See application file for complete search history.

(56) References Cited

U.S. PATENT DOCUMENTS

| | | | | |
|---|---|---|---|---|
| 2013/0346943 | A1* | 12/2013 | Bharatia | G06F 9/4496 717/117 |
| 2014/0107993 | A1* | 4/2014 | Cheng | G05B 17/02 700/32 |
| 2014/0180644 | A1 | 6/2014 | Maturana et al. | |
| 2018/0196899 | A1 | 7/2018 | Crabtree et al. | |
| 2019/0041831 | A1 | 2/2019 | Albers et al. | |

FOREIGN PATENT DOCUMENTS

| | | |
|---|---|---|
| CN | 106662862 A | 5/2017 |
| CN | 107077132 A | 8/2017 |
| CN | 108713174 A | 10/2018 |
| DE | 102016201077 A1 | 7/2017 |

OTHER PUBLICATIONS

Ladiges et al., "Integration of modular process units into process control systems," *IEEE Transactions on Industry Applications*, 54(2): 1870-1880 (Mar./Apr. 2018).
Wassilew et al., "Transformation of the NAMUR MTP to OPC UA to allow plug and produce for modular process automation," *2016 IEEE 21st International Conference on Emerging Technologies and Factory Automation (ETFA)*, IEEE (Sep. 6, 2016).
European Patent Office, Search Report in European Patent Application No. 18188232.5, 9 pp. (Feb. 13, 2019).
European Patent Office, International Search Report in International Patent Application No. PCT/EP2019/071139, 5 pp. (Oct. 9, 2019).
European Patent Office, Written Opinion in International Patent Application No. PCT/EP2019/071139, 7 pp. (Oct. 9, 2019).
China National Intellectual Property Administration, Office Action in Chinese Patent Application No. 201980053378.9, 25 pp. (Jan. 26, 2024).

\* cited by examiner

METHOD ASSOCIATED WITH A SIMULATION MODEL OF A PROCESS MODULE, COMPUTER PROGRAM PRODUCT, AND NON-VOLATILE DATA STORAGE MEDIUM

CROSS-REFERENCE TO RELATED APPLICATIONS

This patent application is a U.S. national phase application of International Patent Application No. PCT/EP2019/071139, filed on Aug. 6, 2019, and claims the benefit of European Patent Application No. 18188232.5, filed Aug. 9, 2018, the disclosures of which are incorporated herein by reference in their entireties for all purposes.

TECHNICAL FIELD

The present disclosure generally relates to a method associated with a simulation model of a process module, to a computer program product relating to such a method, and to a non-volatile data storage medium containing the simulation model of the process module.

BACKGROUND ART

Process engineering plants such as chemical engineering plants or plants in production processes for the pharmaceutical industry typically comprise a plurality of process modules that are combined in a convenient manner to obtain the desired process. In general, modularization by means of such process modules may help to produce chemical or pharmaceutical products in customized processes in an economic manner and even in smaller amounts.

A process module provides one or more module-specific services, or process functions, such as temperature control, dosing, stirring etc.

In the higher-level system (a process control system, e.g. a SCADA system), a plurality of process modules can be linked to one another to obtain a combination of the respective services of the process modules involved. By such a combination, or orchestration, a sub-process or an entire process of the intended product is obtained.

A plurality of process modules can be linked to one another to obtain a combination of the respective services of the process modules. In a defined technical process, each interlinked process module carries out a defined function out of a plurality of possible functions. Such process module functions are referred to as services, or the module functions are regarded to be encapsulated into the services.

Problem to be Solved

When combining/interlinking different types of process modules, e.g. process modules manufactured by different vendors, the module behavior may possibly be different from what is expected. However, details needed for assessing details of the module or the combination of modules may not be available through the module vendor. It is an object of the present application to provide a means for assessing the process module details.

SUMMARY OF THE INVENTION

According to an aspect, a method associated with a simulation model of a process module, the process module being configured to execute at least one module service and the process module being interlinkable or interlinked with further process modules in an automated process engineering plant to carry out a technical process in a cascade of module services, preferably in a chemical engineering plant or pharmaceutics plant, comprises Providing a process logic specification of the technical process; Providing a control logic specification of the process module; Providing a state engine of the process module from a configuration of the at least one service; Providing a process connection information of the technical process; Generating at least a part of the simulation model from a combination of the process logic specification, the control logic specification, the state engine and/or the process connection information; and/or Linking at least a part of the generated simulation model to a module type package, MTP, for the process module or extending a module type package, MTP, for the process module by at least a part of the generated simulation model.

In an example, a complete simulation model is generated. In a further example, only parts of a simulation model are generated.

In the case of a complete simulation model being generated, at least a part of the generated complete simulation model is linked to the MTP or the MTP is extended therewith.

In the case of parts of the simulation model being generated, at least a part of the generated parts of the simulation model are linked to the MTP or the MTP is extended therewith.

In the following, a reference to "the generated simulation model" includes a generated complete simulation model or a generated partial simulation model.

Herein, a technical process is a succession of technical functions to obtain a desired result, such as a chemical process to obtain a certain chemical product or a pharmaceutical process to obtain a certain pharmaceutical product. The succession of the functions defines the process logic. A modular technical process may be visualized as a process graphic in which the succession of the functions is displayed as the interlink of the process modules and their respective services. The process logic typically comprises the interconnection of the process modules or process module services, the kind of service, and a process direction such as a direction of a flow of a substance in a pipe. A process simulation based on the process logic may provide information on e.g. the field instruments, the pipes and tanks, the connections etc.

Each service has a state model. A basic state diagram represents a basic state machine, and comprises, for each service, at least the states "idle", "running", "aborting", and "aborted". "Idle" defines an initial state, "running" defines a state while executing the module function or module functions, "aborting" defines an abort loop or cancellation loop, and the abort loop consists of "aborting" and "aborted". Further loops and resulting states, such as for pausing the service ("pausing", "paused"), holding the service ("holding", "held", "unholding", "restarting"), and/or stopping the service ("stopping", "stopped") can be included into or omitted from the model according to a specific need.

A state engine of a particular process module, as used herein, is typically based on the basic state machine that has been adapted to reflect the configuration of the services of the actual process module, such as the states that are contained in each of the services that can be provided by the process module.

A control logic of a process module describes the internal control structure of the module. For example, the control logic may be derived from cause and effect specifications for each state of a service of the process module, and parameters of the states involved. By way of example, cause and effect specifications may be in the form of extended Cause & Effect matrices and/or contain one or more sequential function charts (SFC).

A process connection information of the technical process provides an information on the different parts of the technical process being interlinked with one another. For example, if the technical process comprises an interconnection of pumps, valves, and tanks, in the example referred to as process components, the process connection information provides an information on the respective connections of the pumps, valves, and tanks in the specific technical process. The process connection information of the technical process may be, for example, human machine interface (HMI) information taken from the MTP of the process module. The HMI information is typically an information of the interconnection of the process components of the technical process.

The simulation model typically describes a module behavior of the process module. The module behavior may include any one or more of a list of all services for the process module, and a specification of one or more service interlocks for conflicting services. An interlock or interlock situation is typically a state in which a state transition into a successor state is not possible, i.e. blocked or locked.

In embodiments, the method further comprises linking at least a part of the generated simulation model to a module type package for the process module or extending the module type package by at least a part of the generated simulation model. Preferably, the module type package is extended by the generated simulation model.

A module type package (MTP) provides information on the interface details, such as the kind of communication with the specific module, command syntaxes for receiving instruction commands, and a signaling scheme for providing the higher-level system with return information. The MTP further comprises a module description of the process module. The information may be contained an MTP file or an MTP database entry. The MTP information may be markup language-based, such as AML-based, CAEX-based or the like, but not limited thereto. An MTP is usually a machine-accessible description file of the process module, typically a file having a markup structure such as an XML file, an AML/CAEX file or the like, or a simpler structure such as JSON or the like.

Typically, the interface details, such as the kind of communication with the specific module, command syntaxes for receiving instruction commands, and a signaling scheme for providing the higher-level system with return information, are contained in a module type package (MTP). Parts of an interface description may be part of a standard that a specific MTP employs; the interface description defined in the standard is further enhanced by the interface details in the MTP. Alternatively or additionally, in embodiments, a markup language-based MTP information may contain a link to a separate information, the separate information being a file or a database or database entry separate from the MTP information. In embodiments, a markup language-based MTP information is extended by the generated simulation model.

By extending the MTP information by at least parts of the generated simulation model, or respectively by linking the MTP information to at least parts of the generated simulation model, the simulation model is easily accessible by different parts of a system such as a simulation system or an orchestration system, possibly making the procedure carried out by the respective system more precise or more reliable. By extending a markup language-based MTP information, such as an MTP file in AML/CAEX format or the like, backwards compatibility is ensured.

Further, in embodiments, the MTP information may be extended by the control logic specification of the process module. Conventionally, the MTP information, e.g. via the MTP file, exposes the process module interface and a description of the module capabilities and/or module functionalitites. The process module interface serves for communication with a higher-level system, e.g. a process control system. By further extending the MTP information by the control logic specification, even more information on the particular process module can be provided to a system such as a simulation system or an orchestration system, possibly making the procedure carried out by the respective system more precise or more reliable.

In embodiments, the generated simulation model or at least a part of it that is linked to the MTP or by which the MTP is extended is generated from engineering information of the process module. Preferably, the generated simulation model or at least a part of it that is linked to the MTP or by which the MTP is extended has the necessary engineering information for simulation. In this way, the storage format can basically remain as before. The system using the MTP may read out the engineering information, and applies a predetermined module generation algorithm on the engineering information to generate an executable simulation model from the engineering information.

In an alternative, the generated simulation model or at least a part of it that is linked to the MTP or by which the MTP is extended comprises an executable simulation model having an interface that is the same as that of areal process module to be simulated. The executable simulation model be used in a simple manner, via the same interface, as the module to be simulated. Preferably, the interface is realized in OPC UA (Open Communication Protocol Unified Architecture).

In embodiments, the state engine is based on a basic state diagram as defined in DIN EN 61512 ed.2 or IEC 61512. In further embodiments, the control logic is derived from cause and effect specifications for each state of a service of the process module and from the parameters of the services that are involved. Typically, the cause and effect specifications are engineered in each state of the module as one or more extended Cause & Effect Matrices (xCE). Also, for more complex control logic, such as for the "running" state, the control logic may also contain sequential function charts (SFC) that include extended logic.

In embodiments, the method further comprises generating a visualization of the generated simulation model and presenting the visualization, preferably via a human machine interface provided by a computer and running a graphical user interface (GUI).

Preferably, the generated simulation model is presented, e.g. to an operating person, by means of the graphical user interface (GUI) on a display means. The display means may be a virtual display, such as a software display interface or a hardware display interface providing display data containing the GUI. The display means may be a physical display such as a screen or the like. The human machine interface may comprise the display means for presenting the graphical user interface.

In embodiments, the method further comprises running the generated simulation model in a simulation environment to simulate the process module, preferably on the computer that provides the human machine interface or on a computer linked with the computer that provides the human machine interface, and establishing a process module test scenario in the simulation environment to test the function of the simulated process module. The simulation environment may be an engineering tool of the process module. By running the simulation, the module configuration can be tested before actually employing the real module. Moreover, by running the simulation, a new process module logic (e.g., control logic) or further changes to the process module can be tested. Hence, possible errors may be found early and in a quick manner.

In embodiments, the method further comprises providing the generated simulation model to an orchestration system for a modular plant, and establishing an orchestration logic test scenario in the orchestration system using the generated simulation model. An orchestration system provides an operating person with a possibility to choose the process modules for a specific process and combine the process modules. The overall logic, or orchestration logic, within the orchestration system depends on the logic of the process modules involved. In the orchestration system, or orchestration engineering tool, that is provided with the generated simulation model, the orchestration logic can be tested with the simulated module or modules before a real module is employed. Moreover, different test cases can be tested in the simulated environment inside the orchestration system. Also here, possible errors may be found early and in a quick manner.

In embodiments, the method further comprises providing a machine learning information of the technical process. In the generating according to the method, the combination that is used in the generating further comprises the machine learning information.

For example, the machine learning information are derived from a machine learning process of a real module to be simulated. The machine learning process may employ, for example, an artificial intelligence (AI) process. In the machine learning process, as an example, a real module in a technical process may be subjected to different parameters or different aspects suitable for one or more specific module services that the real module provides. As a non-limiting example, a module that provides a service for heating liquids may be subjected to different liquids one at a time, such as water and ethanol. A difference in the behavior of the real module that goes along with such different liquids to be heated is an example of the machine learning information. Providing the machine learning information may contribute to an enhancement or refinement of the simulation model to be generated.

In a further aspect, a non-volatile data storage medium is provided. The data storage medium contains, as data recorded thereon, a simulation model of a process module. The simulation model is obtained by a method as described herein. Preferably, the data storage medium contains, as data recorded thereon, the simulation model linked to a module type package for the process module. Alternatively, the data storage medium contains, as data recorded thereon, a module type package for the process module extended by the generated simulation model.

According to yet a further aspect, a computer program product is provided. The computer program product comprises a non-volatile data storage medium. The data storage medium of the computer program product includes instructions that, when loaded into a computer and executed thereon, make the computer conduct the method as described herein.

BRIEF DESCRIPTION OF EMBODIMENTS

In the following, embodiments of the present disclosure will be described with reference to the drawings, in which.

DETAILED DESCRIPTION

Figure 1:
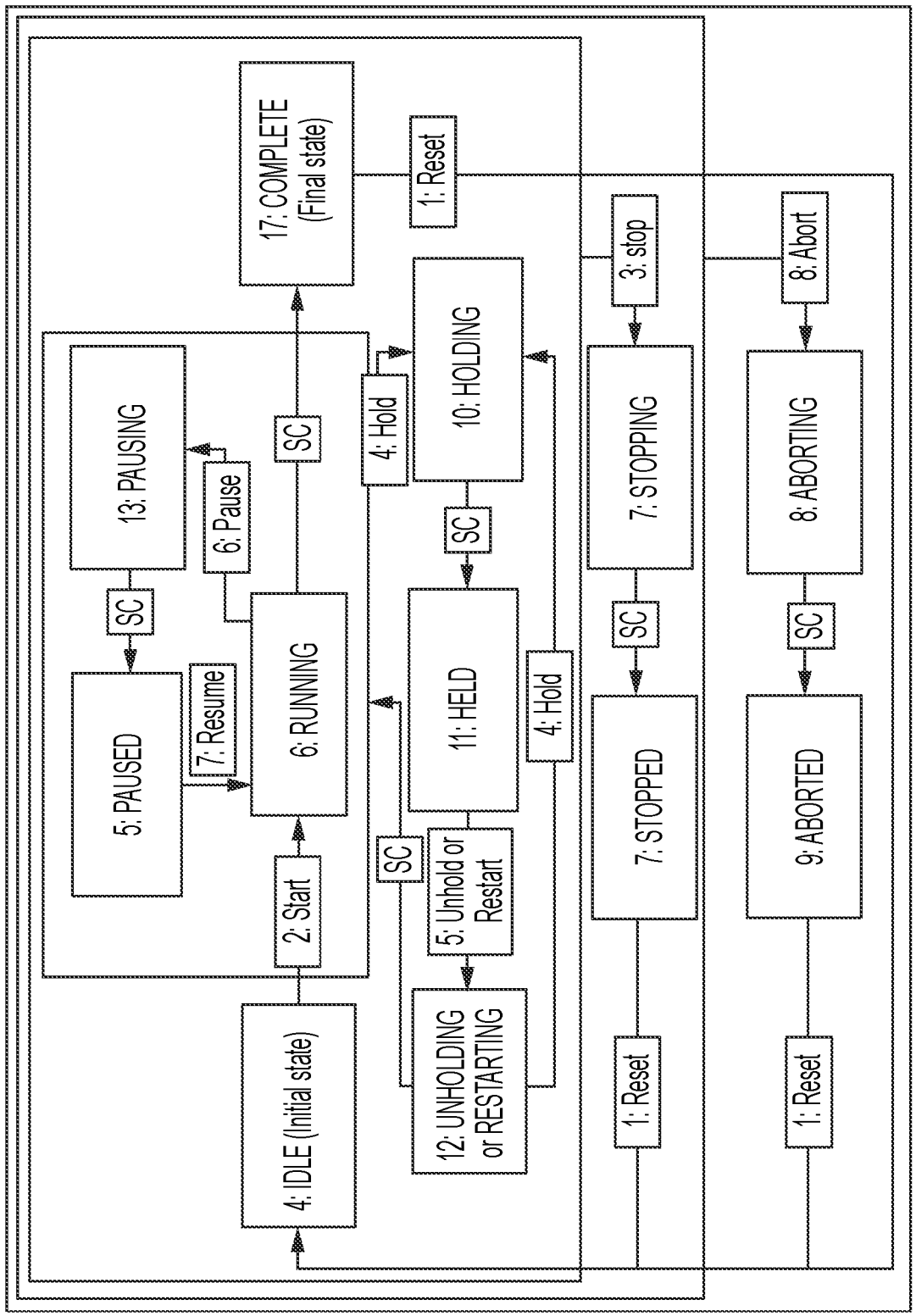
FIG. 1 is a schematic basic state diagram of a state model of a process module to be used in a method according to an embodiment.

The following describes embodiments of the present disclosure in a more detailed manner. It is understood that aspects, features and advantages of the embodiments can be combined with one another or omitted, as appropriate and as understood by the skilled person. In the following description, like reference numerals describe like functions that are applicable to all of the figures, and a repeated description of such like functions is abbreviated or omitted as appropriate.

A schematic basic state diagram of a state model of a process module is exemplarily shown in FIG. 1. The process module itself is not shown in FIG. 1. The process module provides provide module-specific services, or process functions, such as temperature control, dosing, stirring etc. By combining multiple process modules, e.g. under the control of a process control system (not shown), a modular plant for carrying out a technical process can be composed. The technical process may be, but is not limited to, a chemical or a pharmaceutical process.

The basic state diagram of FIG. 1 complies with DIN EN 61512 ed.2 or IEC 61512. The basic state diagram comprises, for each service, at least the states "idle", "running", "aborting", and "aborted". "Idle" defines an initial state, "running" defines a state while executing the module function or module functions, "aborting" defines an abort loop or cancellation loop, and "aborting" is the state reached after the abort loop has been finished. Further loops and resulting states, such as for pausing the service ("pausing", "paused"), holding the service ("holding", "held", "unholding", "restarting"), and/or stopping the service ("stopping", "stopped") may be freely chosen as appropriate, i.e. can be included into or omitted from the model according to a specific need. If the service is self-completing, the state model also includes a "completed" state. If the service is continuous, no such "completed" state is present, and the continuously running service typically has parameters that may be adjusted while the service is executed. In such a continuous service, the "stopping" loop is likely implemented. If an unplanned stop cannot be discriminated from a planned stop, implementing the "aborting" loop may be sufficient.

Figure 2:
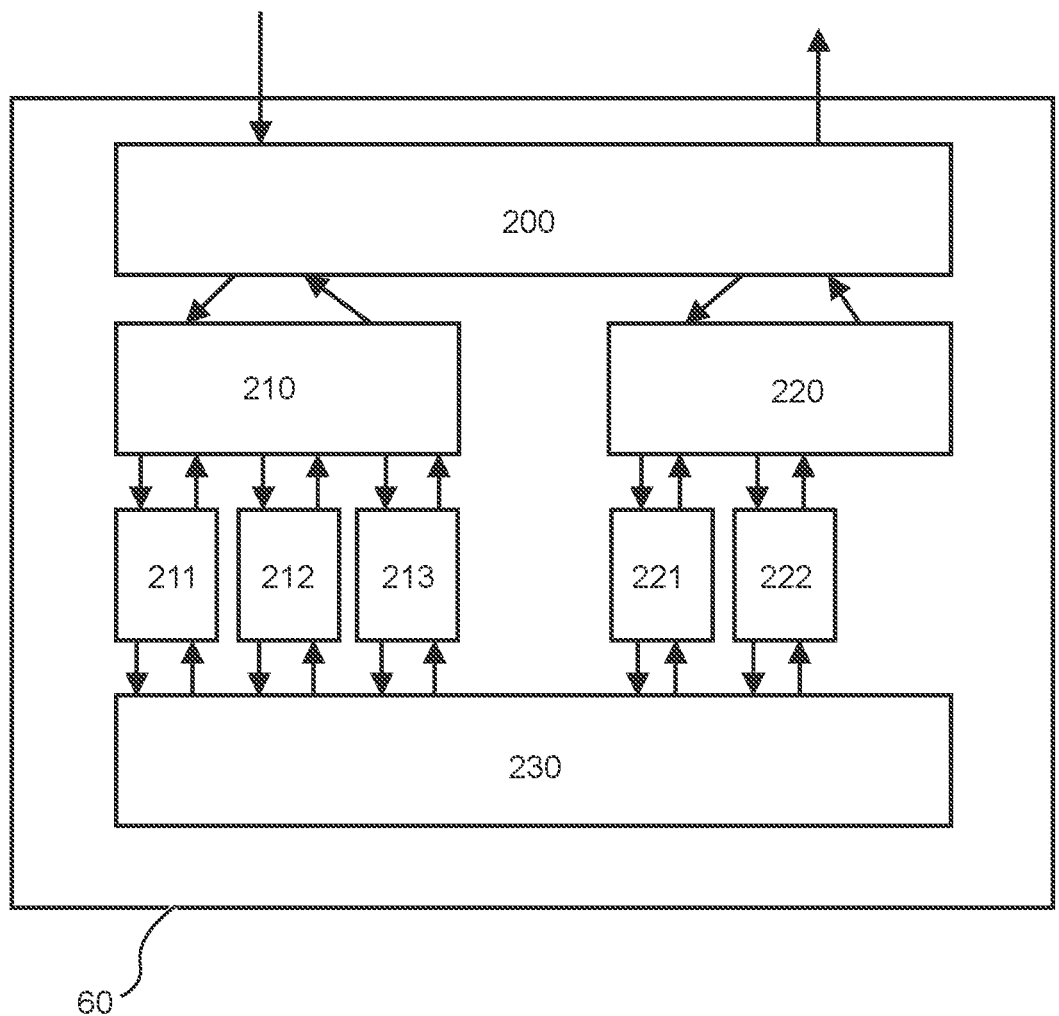
FIG. 2 is a schematic representation of a simulation model of a process module, including an information flow during a simulation of the process module.

FIG. 2 is a schematic representation of a simulation model of a process module 60, including an information flow during a simulation of the process module. Arrows in FIG. 2 show bi-directional internal information exchange paths between a module control part 200 and process module service parts 210, 220, between the process module service parts 210, 220 and a process module state logic part 211, 212, 213, 221, 222, between the process module state logic part 211, 212, 213, 221, 222, and a process simulation part 230. Further arrows show a bi-directional external information exchange path from the inside of the module 60 to the outside of the module 60.

The module control part 200 comprises information on the control services within the module 60, including a list with all process module service parts 210, 220, the service interlocks (i.e., mutual exclusion of different module service parts 210, 220 being in the "running" state at the same time), and commands to the module service parts 210, 220.

The module service parts 210, 220 comprise the state engines for each service of the module 60. By way of example, and not limiting, the module service part 210 may describe a service of "inerting", while the module service part 220 may describe a service of "heating".

The process module state logic parts 211, 212, 213, 221, 222 comprise a state logic simulation, including a control logic within the states, and a logic for transition to subsequent states. For example, the module state logic part 211 comprises a state logic simulation for the "running" state of module service part 210; the module state logic part 212 comprises a state logic simulation for the "aborting" state of module service part 210; the module state logic part 211 comprises a state logic simulation for the "aborted" state of module service part 210; the module state logic part 221 comprises a state logic simulation for the "running" state of module service part 220; the module state logic part 222 comprises a state logic simulation for the "stopping" state of module service part 210, etc. The process simulation part 230 provides a simulation of the process, such as a simulation of instruments, pipes, tanks, connections etc.

Figure 6:
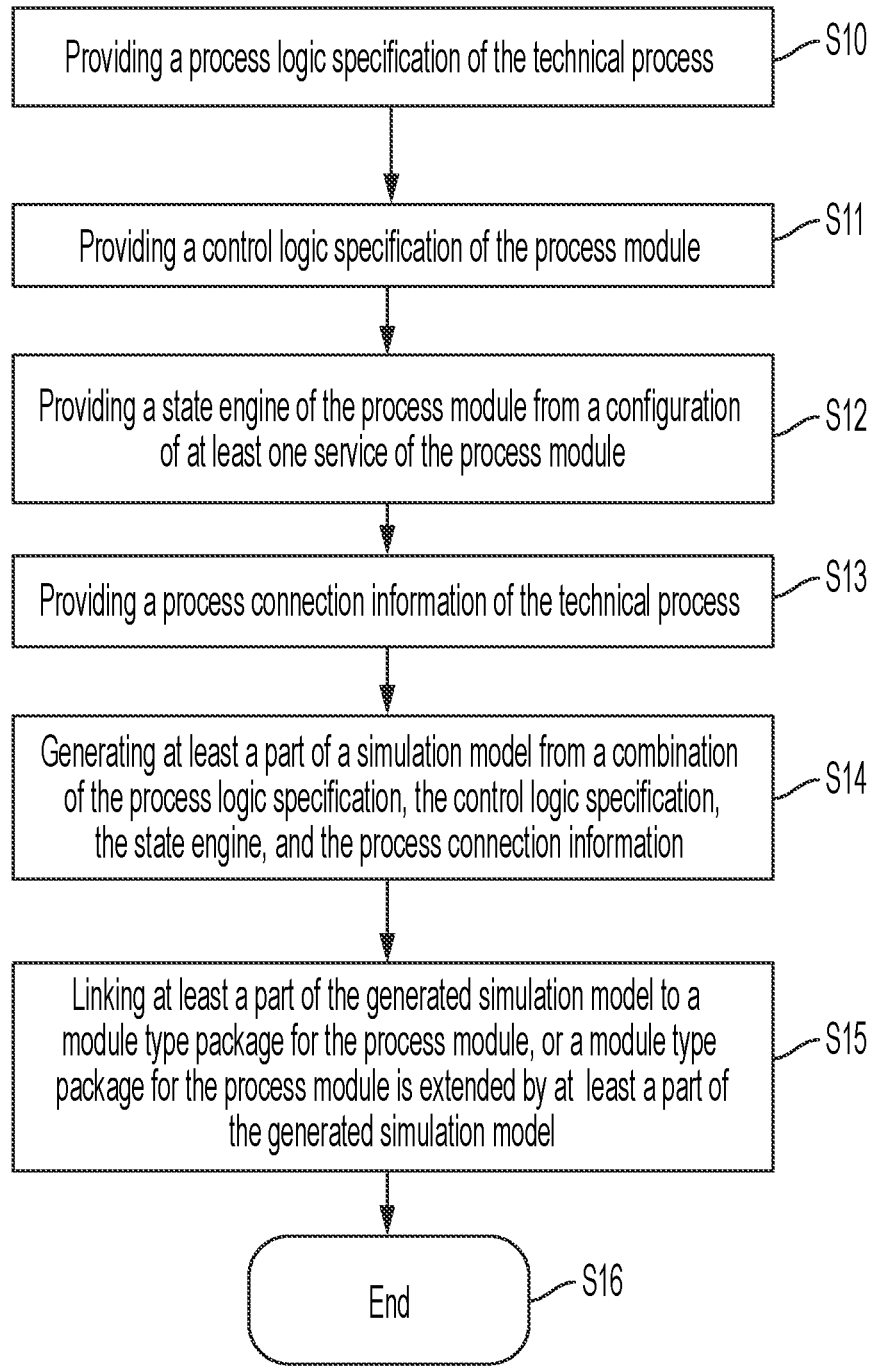
FIG. 6 shows a flow chart of a method according to an embodiment.

With reference to the flow chart of FIG. 6, an embodiment of a method associated with the simulation model e.g. of FIG. 2 is described.

The method comprises, in S10, providing a process logic specification of the technical process. The process logic typically comprises the interconnection of the process modules or process module services, the kind of service, and a process direction such as a direction of a flow of a substance in a pipe.

The process logic is preferably generated from process graphics of the desired process. For example, an operating person may combine the process modules or process module services and add information on the direction of the flow in the process, e.g. the flow of substances in pipes etc.

In S11, a control logic specification of the process module 60 is provided. The control logic specification is preferably created from extended Cause and Effect matrices (xCE) which are engineered in each state, but it is not limited to xCE and may be engineered in a format different from xCE. An extended Cause and Effect matrix may be configured as described in EP 2 899 630 A1. Particularly in the case of a more complex control logic, e.g. for the "running" state, the control logic preferably comprises one or more sequential function charts (SFC) that include logic. The control logic specification is further based on the parameters of the states.

In embodiments, the control logic is obtained from an extension of a module type package (MTP) of the process module 60. The MTP may be in the form of an MTP file, e.g. in the format of PLCOpenXML as a part of the AML standard. The control logic typically extends one or more cause and effect matrices in the MTP file. By providing the process module logic belonging to a specific process module 60, the logic is exposed and accessible, making the process module 60 a white box from a control logic standpoint.

In S12, a state engine of the process module 60 is provided from a configuration of at least one service of the process module 60. The state engine is typically based on a configuration of the service of the process module like which states are contained in which service, plus the basic state machine e.g. of FIG. 1.

In S13, a process connection information of the technical process is provided. The process connection information typically comprises an interconnection of the process components of the technical process.

In S14, at least a part of a simulation model is generated from a combination of the process logic specification provided in S10, the control logic specification provided in S11, the state engine provided in S12, and the process connection information provided in S13. The at least part of the simulation model typically describes at least parts of the module behavior. The simulation model may be based on a list of all services for the current process module 60 and service interlocks such that commands for e.g. starting a service which is currently interlocked (e.g., the "running" state) as a conflicting (interlocked) service are not executed.

In S15, at least a part of the simulation model generated in S14 is either linked to a module type package (25) for the process module (60), or a module type package (25) for the process module (60) is extended by at least a part of the simulation model generated in S14.

After having linked or extended the simulation model to the MTP (25) in S15, the process in FIG. 6 ends with S16. However, a method described herein may comprise further steps using the generated simulation model.

Figure 3:
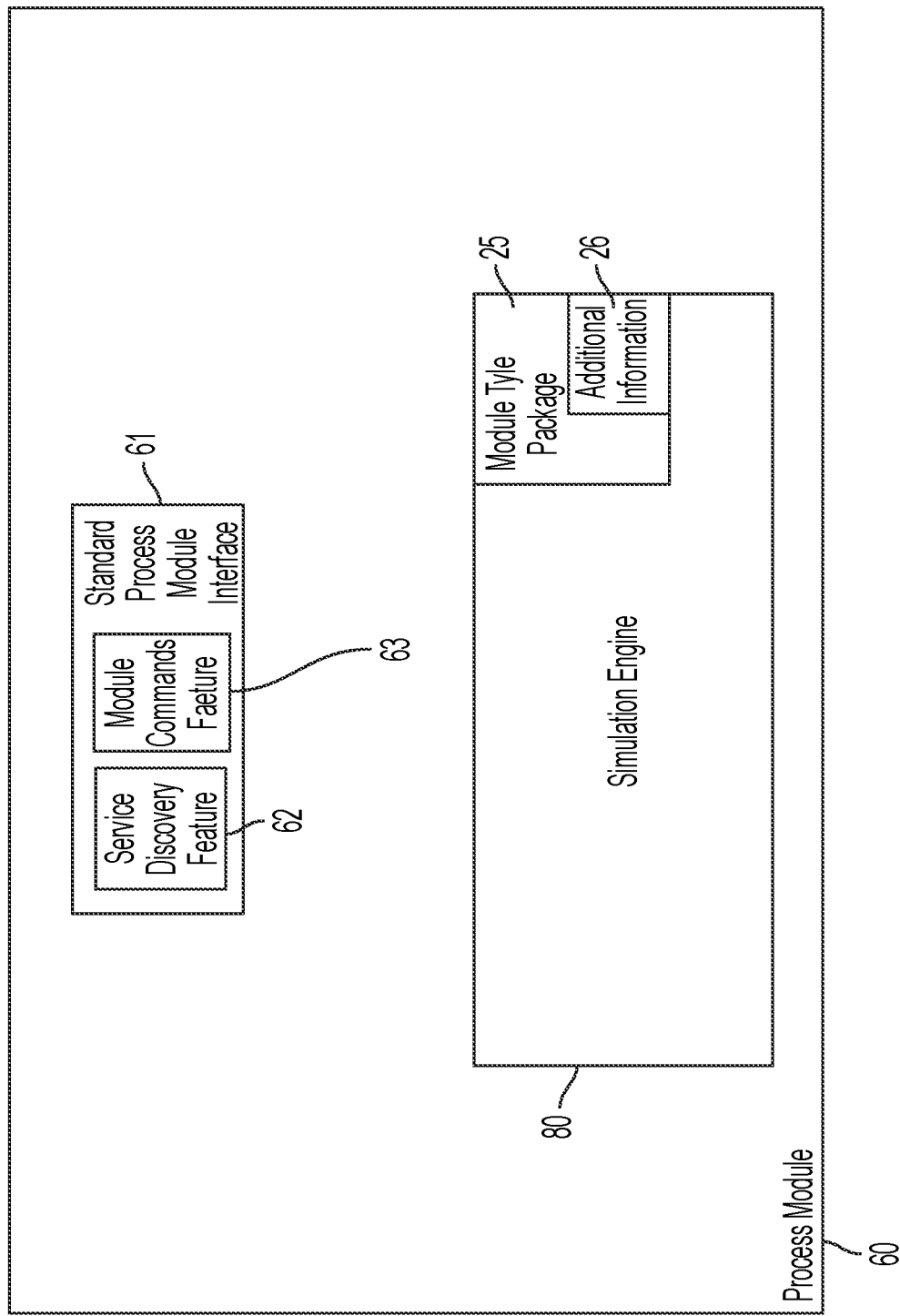
FIG. 3 illustrates a simulation model of a process module, generated by a method according to an embodiment, the process module having a standard process module interface.

FIG. 3 illustrates a simulation model of the process module 60 that is generated by a method according to the embodiment. The process module 60 has a standard process module interface 61. The simulation model or at least a part of it that is linked to the MTP or by which the MTP is extended preferably comprises an executable simulation model. In the simulation model, the interface 61 is the same as that of the real process module that is simulated. In the embodiment, the interface 61 is realized as an OPC UA (Open Communication Protocol Unified Architecture) interface. The interface 61 of FIG. 3 comprises a service discovery feature 62 and a module commands feature 63.

The simulation model of the process module 60 further comprises a simulation engine 80. The simulation engine 80 accesses a module type package 25 associated with the process module 60. The module type package 25 has been extended by additional information 26, the additional information comprising at least the generated simulation model or pats of it. Furthermore, the additional information 26 may also include the module control logic.

The simulation model of the process module 60 can be accessed via the interface 61, and the simulation engine 80 may be run upon access via the interface 61. The simulation model of the process module 60 can be used, for example, in an engineering tool of the process module 60. Here, the module configuration can be tested early on, possibly even before a real module is constructed. Also, new logic or changes can be tested, and thus errors can be detected or discovered at an early stage and in a quick manner.

Figure 4:
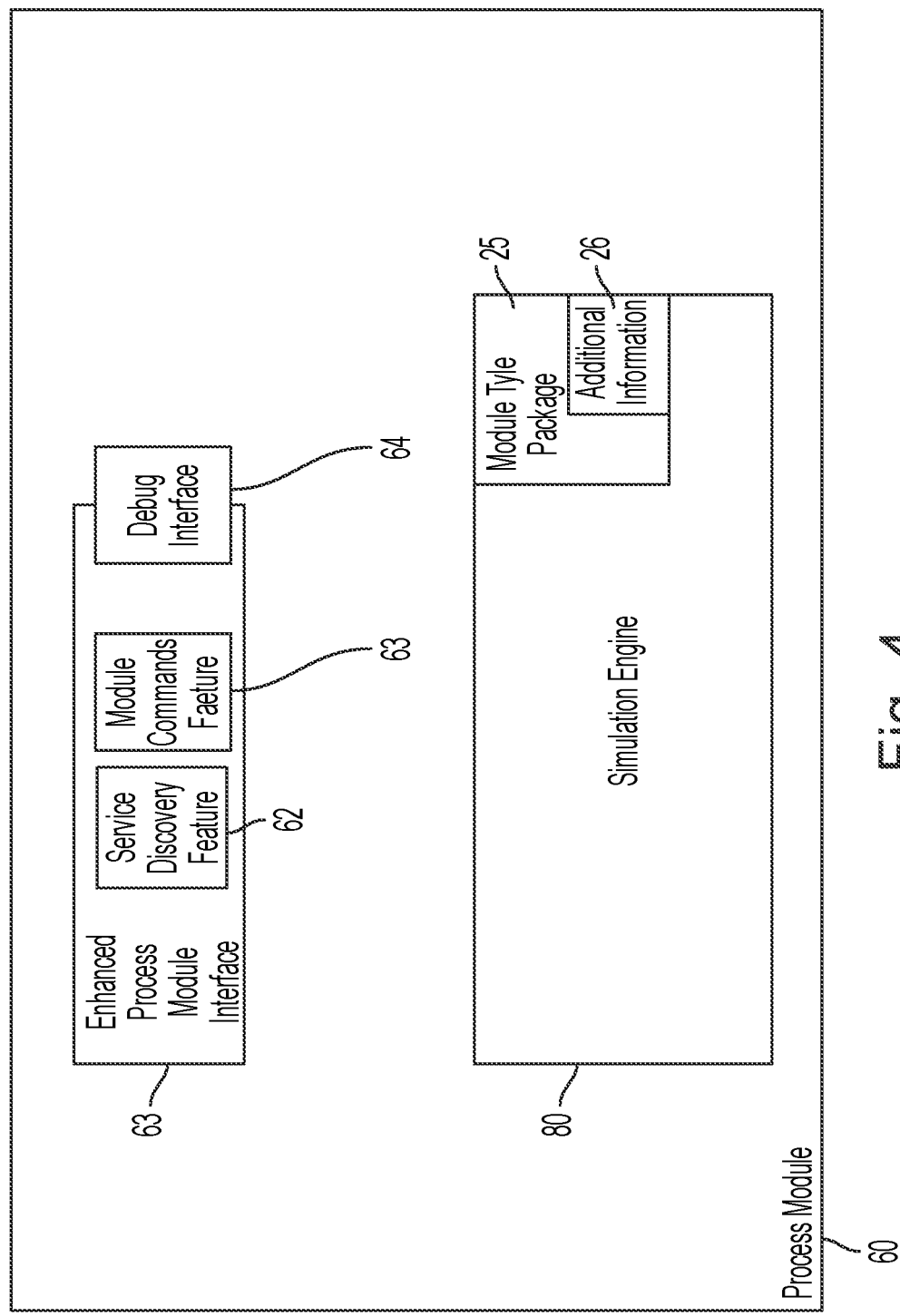
FIG. 4 illustrates a simulation model of a process module, generated by a method according to an embodiment, the process module having an enhanced process module interface.

FIG. 4 illustrates a simulation model of the process module 60 similar to that of FIG. 3. Thus, repeated descriptions of like parts to FIG. 3, having like reference numerals, are basically the same and therefore omitted from FIG. 4. In FIG. 4, the process module has an enhanced process module interface 61.

The enhanced process module interface 61 of FIG. 4 is basically the same as the basic process module interface 61 of FIG. 3; however, in the enhanced process module interface 61 of FIG. 4, a debug interface 64 has been added. The debug interface 64 can equip the simulation model of the process module 60 with enhanced capabilities regarding the ability to set process values. Via the debug interface 64, for example, tank levels can be quickly set instead of running a (simulated) service that is started, whereupon the (simulated) tank is filled. The debug interface 64 is, however, not limited to this example, and different process values may be set or read via the debug interface 64.

Figure 5:
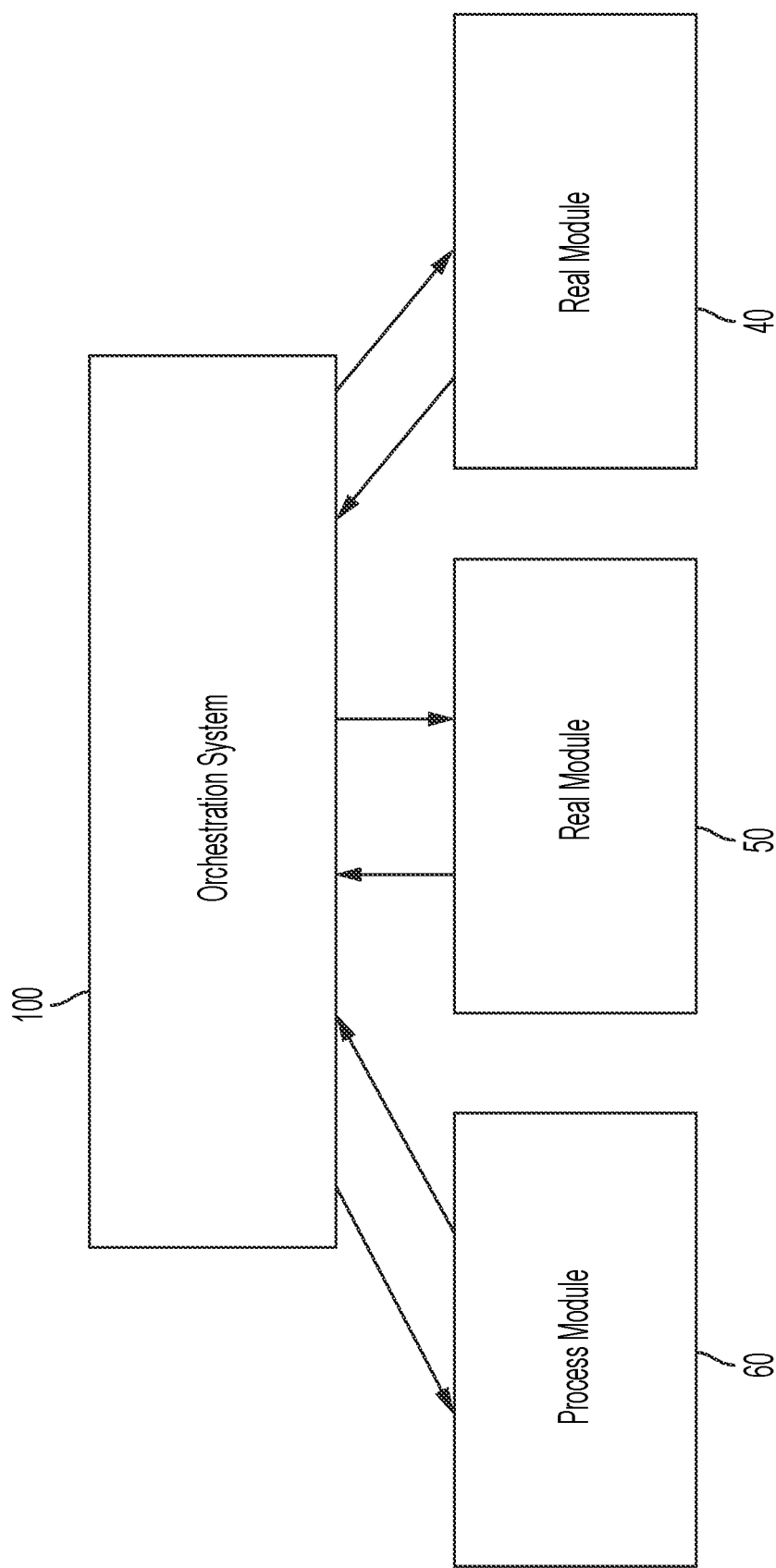
FIG. 5 illustrates a schematic representation of an orchestration system using, among others, a simulation model of a process module generated by a method according to an embodiment

FIG. 5 illustrates a schematic representation of an orchestration system 100. The orchestration system 100 uses, i.e. accesses and executes, a simulation model of a process module 60 generated by the method according to the embodiment. The orchestration system 100 further uses a real module 40 and a real module 50.

In the orchestration system 100 for the modular plant, an orchestration engineering tool is used for testing the orchestration logic of the modular plant. The simulation model of the process module 60 can be run in connection with running the real modules 40, 50.

An operating person is provided with a possibility to choose the simulation model of the process module 60, together with real modules 40, 50, to combine the simulated module 60 and the real modules 40, 50 for a specific process, e.g. via a human machine interface running a graphical user interface (GUI) that is presented on a display means (not shown).

In the orchestration system 100, an orchestration logic test scenario is established using the generated simulation model of the process module 60. The overall logic, or orchestration logic, within the orchestration system 100 depends on the logic of the simulated process module 60 and the real process modules 40, 50. In the orchestration system 100 that is provided with the generated simulation model of the process module 60 and with the real process modules 40, 50, the orchestration logic can be tested. Moreover, different test cases can be tested in the simulated environment inside the orchestration system. Also here, possible errors may be found early and in a quick manner. Also, testing of the module orchestration can be started and tested without all modules being available. In the example shown in FIG. 5, the module orchestration can be started and tested with real process modules 40, 50 being available and process module 60 being only available in the form of the simulation model.

With the technique according to the present disclosure, any or all of the following can be achieved: Easy testing of the behavior of a process module; easer testing of an orchestration of multiple, real and/or simulated, process modules; fast debugging/fast commissioning.

The invention claimed is:

1. A method associated with a simulation model of a process module, the process module being configured to execute at least one module service and the process module being interlinkable or interlinked with further process modules in an automated process plant to carry out a technical process in a cascade of module services, preferably in a chemical plant or pharmaceutical plant, the method comprising:

Providing a process logic specification of the technical process;

Providing a control logic specification of the process module;

Providing a state engine of the process module from a configuration of the at least one service;

Providing a process connection information of the technical process;

Generating at least a part of the simulation model from a combination of at least two of the process logic specification, the control logic specification, the state engine and the process connection information;

Linking at least a part of the generated simulation model to a module type package for the process module, or extending a module type package for the process module by at least a part of the generated simulation model; and Providing the generated simulation model to an orchestration system for a modular plant, and establishing an orchestration logic test scenario in the orchestration system using the generated simulation model.

2. The method of claim 1, wherein the process connection information of the technical process is a human machine interface (HMI) information, typically an HMI information of an interconnection of process components of the technical process.

3. The method of claim 1, wherein the at least part of the generated simulation model is generated from engineering information of the process module.

4. The method of claim 1, wherein the at least part of the generated simulation model comprises an executable simulation model having an interface that is the same as that of the simulated process module.

5. The method of claim 1, wherein the state engine is based on a basic state diagram as defined in DIN EN 61512 ed.2 or IEC 61512.

6. The method of claim 1, wherein the control logic is derived from cause and effect specifications for each state of a service, and parameters of the services involved.

7. The method of claim 1, further comprising generating a visualization of the generated simulation model and presenting the visualization, preferably via a human machine interface provided by a computer and running a graphical user interface.

8. The method of claim 1, further comprising running the generated simulation model in a simulation environment to simulate the process module, preferably on the computer that provides the human machine interface or on a computer linked with the computer that provides the human machine interface, and establishing a process module test scenario in the simulation environment to test the function of the simulated process module.

9. The method of claim 1, further comprising providing a machine learning information of the technical process, wherein the combination of the at least two of the process logic specification, the control logic specification, the state engine, and the process connection information further includes the machine learning information.

10. A non-volatile data storage medium containing, as data recorded thereon, a simulation model of a process module, the simulation model obtained by a method according to claim 1, in particular the data storage medium containing, as data recorded thereon, the simulation model linked to a module type package for the process module or a module type package for the process module extended by the generated simulation model.

11. A non-transitory computer program product comprising a non-volatile data storage medium, the data storage medium including instructions that, when loaded into a computer and executed thereon, make the computer conduct the method according to claim 1.

* * * * *